US012696251B2

(12) United States Patent
Clancy et al.

(10) Patent No.: US 12,696,251 B2
(45) Date of Patent: Jul. 28, 2026

(54) OPERABILITY INDICATOR OF A 6 GHz WI-FI DEVICE AT A LOCATION

(71) Applicant: Thomson Licensing, Cersson-Sevigne (FR)

(72) Inventors: Paul A. Clancy, Duluth, GA (US); Charles P. Cheevers, Alpharetta, GA (US)

(73) Assignee: Thomson Licensing, Cesson-Sevigne (FR)

( * ) Notice: Subject to any disclaimer, the term of this patent is extended or adjusted under 35 U.S.C. 154(b) by 360 days.

(21) Appl. No.: 18/526,198

(22) Filed: Dec. 1, 2023

(65) Prior Publication Data

US 2024/0196384 A1      Jun. 13, 2024

Related U.S. Application Data

(60) Provisional application No. 63/431,468, filed on Dec. 9, 2022.

(51) Int. Cl.
*H04W 72/0453* (2023.01)
*H04W 84/12* (2009.01)
(52) U.S. Cl.
CPC ........ *H04W 72/0453* (2013.01); *H04W 84/12* (2013.01)
(58) Field of Classification Search
CPC . H04W 72/0453; H04W 84/12; H04W 48/16; H04W 48/20; H04W 88/08
See application file for complete search history.

(56) References Cited

U.S. PATENT DOCUMENTS

| | | | |
|---|---|---|---|
| 2016/0112942 A1* | 4/2016 | Chang | H04W 48/20 |
| | | | 455/434 |
| 2019/0141620 A1* | 5/2019 | Pujari | H04W 48/16 |
| 2020/0280918 A1* | 9/2020 | Huang | H04W 80/02 |
| 2020/0413491 A1* | 12/2020 | Ansley | H04W 92/02 |
| 2021/0112373 A1* | 4/2021 | Pazhyannur | H04W 76/10 |
| 2021/0168722 A1* | 6/2021 | Reshef | H04W 52/0245 |

* cited by examiner

*Primary Examiner* — Dady Chery
(74) *Attorney, Agent, or Firm* — James Shead; David Todd Shoneman; Michael A. Pugel

(57) ABSTRACT

A 6 GHz Wi-Fi device must obtain operability information to operate at a location. Providing a user with an operability indicator for a 6 GHz Wi-Fi device at a location can conserve resources and enhance the quality of experience for a user. A user interface can receive a location input from a user interface, for example, a user input or pre-filled information. The location can be determined based on the location input, for example, one or more location parameters. The one or more location parameters can be previously stored or retrieved from, for example, a network resource, such as a geocoding service. The user interface can provide an operability indicator to the user interface that indicates whether the 6 GHz Wi-Fi device is operable at one or more 6 GHz frequencies and a transmit power associated with allowed or permitted one or more 6 GHz frequencies.

20 Claims, 9 Drawing Sheets

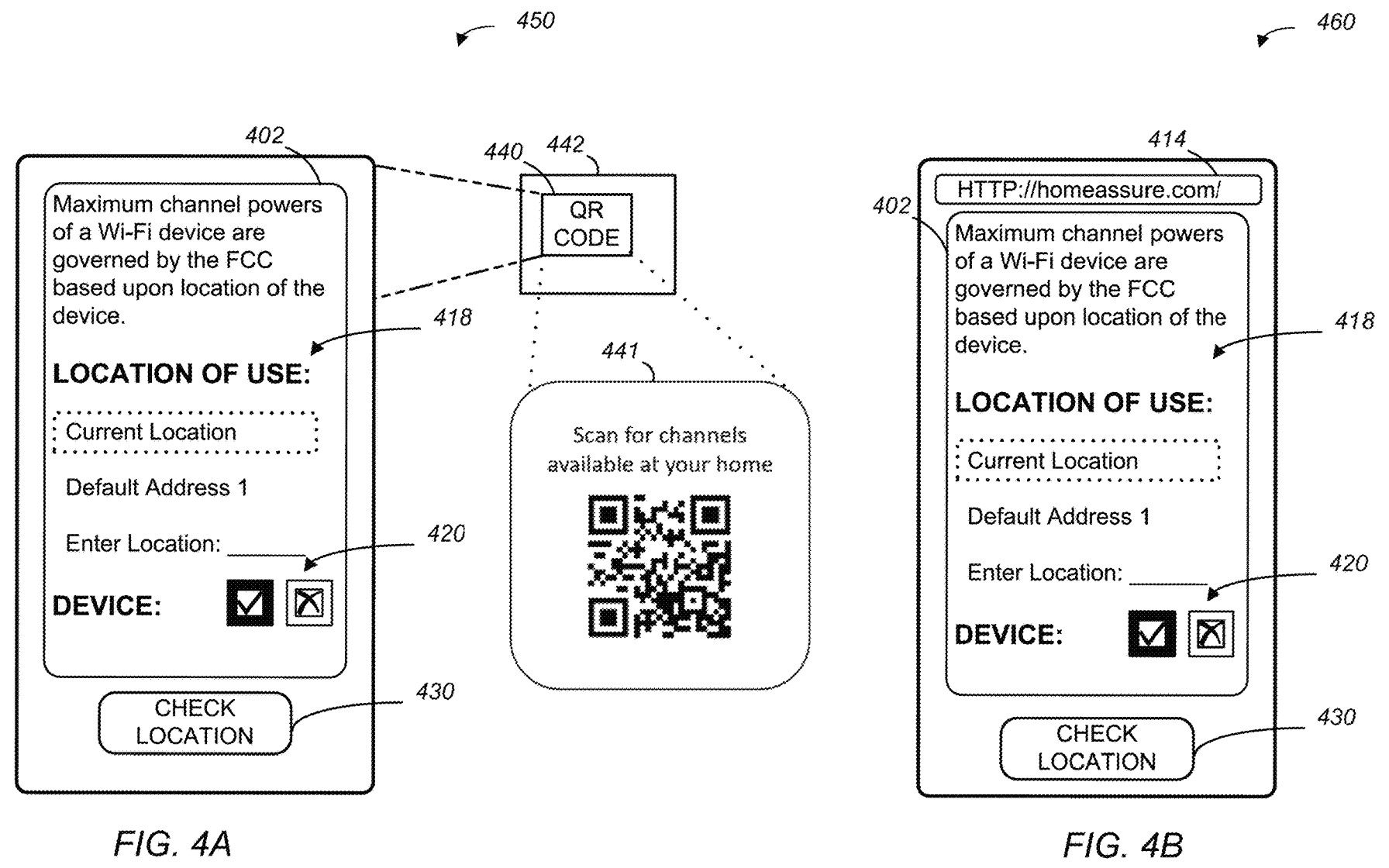

Maximum channel powers of a Wi-Fi device are governed by the FCC based upon location of the device.

LOCATION OF USE:

Current Location

Default Address 1

Enter Location:

DEVICE:

CHECK LOCATION

*FIG. 4B*

Scan for channels available at your home

QR CODE

Maximum channel powers of a Wi-Fi device are governed by the FCC based upon location of the device.

LOCATION OF USE:

Current Location

Default Address 1

Enter Location:

DEVICE:

CHECK LOCATION

*FIG. 4A*

HTTP://homeassure.com/

464

Device Location Setup

Select the home type by story count OR enter minimum and
maximum heights for device location.

410

| Single Story | Two Story | Three Story |

403

Min height (meters)

0

Max height (meters)

6

405

Find Allowed Channels

412

409

Enter Height

S110
Providing a user interface to a user

S120
Determining a location associated with the 6 GHz Wi-Fi device based on a location input from the user interface S130
Determining an operability indicator associated with the 6 GHz Wi-Fi device based on the location S140
Providing the operability indicator to the user interface

OPERABILITY INDICATOR OF A 6 GHz WI-FI DEVICE AT A LOCATION

BACKGROUND

Not all locations are suitable for a Wireless Fidelity (Wi-Fi) device that operates in the 6 Gigahertz (GHz) frequency band. Such a device must operate within power operation levels designated by results from querying an automated frequency coordination (AFC) system. As a 6 GHz Wi-Fi device is not permitted to operate using a channel that interferes with legacy 6 GHz wireless infra-structures, which can lead to confusion to a user when such a 6 GHz capable Wi-Fi device fails to operate in the 6 GHz band. Therefore, there is a need to provide an operability indicator, for example, that a 6 GHz Wi-Fi device will be permitted or allowed to operate at a transmit power or that a 6 GHz Wi-Fi device will provide an improved quality of experience (QoE).

SUMMARY

Given the various network activities that include substantial reliance on Internet access, especially indoor Wi-Fi or Internet access, and increased access to network resources, it is becoming imperative to provide the best optimized access to the network for all users and/or network devices seeking access to any number of network resources. A network that utilizes the 6 GHz frequency band (that represents 1200 MHz of spectrum) can provide users of the network environment an option for a less crowded network and can enhance the quality of experience (QoE) of the users. However, certain areas do not allow or permit a 6 GHz Wi-Fi device to operate or to operate at a transmit power above a low power as the areas are restricted. A user may not realize that the location of intended use of a 6 GHz Wi-Fi device will not provide expected QoE as the location is within such a restricted area. Thus, the user has expended resources, including, but not limited to, time and costs, without receiving the expected QoE. One or more novel solutions of the present disclosure provide an operability indicator that a 6 GHz Wi-Fi device is operational (such as would be allowed or permitted to operate) at a location, such as at, about, and/or within a premise, for example, that the 6 GHz Wi-Fi device is allowed or permitted to operate at the transmit power for the location and/or that the 6 GHz Wi-Fi device is allowed or permitted to operate at a transmit power other than low power at the location, such as a premises, for example, a home or office.

An aspect of the present disclosure provides a method for providing an operability indicator associated with a location of a 6 Gigahertz (GHz) wireless fidelity (Wi-Fi) device. The method comprises providing a user interface to a user, determining a location associated with the 6 GHz Wi-Fi device based on a location input from the user interface, determining an operability indicator associated with the 6 GHz Wi-Fi device based on the location, and providing the operability indicator to the user interface.

In an aspect of the present disclosure, the method is such that the operability indicator is a visual indicator.

In an aspect of the present disclosure, the method is such that the operability indicator indicates one or more 6 GHz channels that the 6 GHz Wi-Fi device can utilize at the location.

In an aspect of the present disclosure, the method is such that the operability indicator indicates a transmit power associated with the one or more 6 GHz channels.

In an aspect of the present disclosure, the method is such that the user interface is accessed via any of a uniform resource locator (URL), an application of a network device, a link, a hyperlink, an application programming interface (API) of a network resource or any combination thereof.

In an aspect of the present disclosure, the method is such that the location input is pre-filled in the user interface.

In an aspect of the present disclosure, the method is such that determining the operability indicator comprises sending a request to an automated frequency coordination (AFC) system, wherein the operability indicator is based on the transmit power information received from the AFC system based on the request.

An aspect of the present disclosure provides a network device for providing an operability indicator associated with a location of a 6 Gigahertz (GHz) wireless fidelity (Wi-Fi) device. The network device comprises a memory storing one or more computer-readable instructions and a processor configured to execute the one or more computer-readable instructions stored on the memory to cause the network device to provide a user interface to a user, determine a location associated with the 6 GHz Wi-Fi device based on a location input from the user interface, determine an operability indicator associated with the 6 GHz Wi-Fi device based on the location, and provide the operability indicator to the user interface.

In an aspect of the present disclosure, at least one of the operability indicator is a visual indicator and the location input is pre-filled in the user interface.

In an aspect of the present disclosure, the operability indicator indicates one or more 6 GHz channels that the 6 GHz Wi-Fi device can utilize at the location.

In an aspect of the present disclosure, the operability indicator indicates a transmit power associated with the one or more 6 GHz channels.

In an aspect of the present disclosure, the user interface is accessed via any of a uniform resource locator (URL), an application of a network device, a link, a hyperlink, an application programming interface (API) of a network resource or any combination thereof.

In an aspect of the present disclosure, determining the operability indicator comprises sending a request to an automated frequency coordination (AFC) system, wherein the operability indicator is based on the transmit power information received from the AFC system based on the request.

An aspect of the present disclosure provides a non-transitory computer-readable medium for storing one or more instructions for providing an operability indicator associated with a 6 Gigahertz (GHz) wireless fidelity (Wi-Fi) device, that when executed by a processor. The one or more instructions, that when executed by a processor, cause the processor to perform one or more operations including the steps of the methods described above.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to some example embodiments.

Thus, according to various aspects of the present disclosure described herein, it is possible to indicate that a 6 GHz Wi-Fi device is operational and/or operational at a transmit power above low power at a location so as to provide enhanced or improved QoE.

BRIEF DESCRIPTION OF DRAWINGS

In the drawings, like reference numbers generally indicate identical, functionally similar, and/or structurally similar elements.

FIGS. 4A-4D illustrate a user interface for indicating operability of a 6 GHz Wi-Fi device at a location, such as whether a 6 GHz Wi-Fi network device is operational at a premise in a network environment, according to one or more aspects of the present disclosure;

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
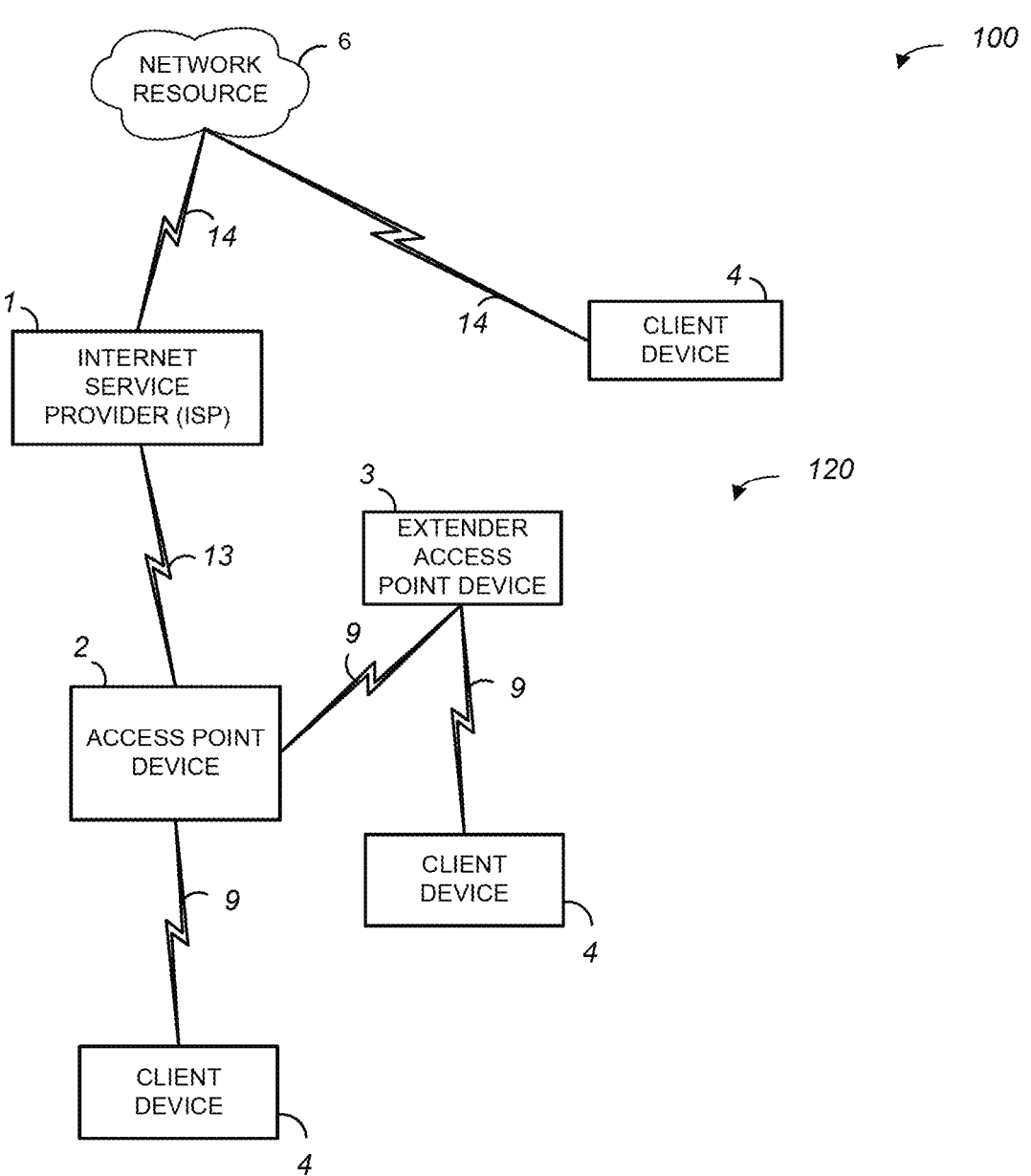
FIG. 1 is a schematic diagram of a network environment, according to one or more aspects of the present disclosure.

FIG. 1 is a schematic diagram of a network environment 100, according to one or more aspects of the present disclosure. It should be appreciated that various example embodiments of inventive concepts disclosed herein are not limited to specific numbers or combinations of devices, and there may be one or multiple of some of the aforementioned electronic apparatuses or network devices in the network environment, which may itself consist of multiple communication networks and various known or future developed wireless connectivity technologies, protocols, devices, and the like.

A network environment 100 comprises a network or a premise (such as a home or an office) 120, an Internet Service Provider (ISP) 1 and a network resource 6. The network 120 comprises an access point device 2 connected to a network resource 6, such as a cloud-based repository, via an ISP 1 and also connected to different wireless devices or network devices such as one or more wireless extender access point devices 3 and one or more client devices 4. The network environment 100 shown in FIG. 1 includes wired and/or wireless network devices (for example, an access point device 2, one or more extender access point device 3 and one or more client devices 4) that may be connected in one or more wireless networks (for example, private, guest, iControl, backhaul network, or Internet of things (IoT) network) within the network environment 100. Additionally, there could be some overlap between network devices (for example, extender access point devices 3 and client devices 4) in the different networks. That is, one or more network or wireless devices could be located in more than one network. For example, the extender access point devices 3 could be located both in a private network for providing content and information to a client devices 4 and also included in a backhaul network or an iControl network.

The ISP 1 can be, for example, a content provider or any computer for connecting the access point device 2 to the network resource 6. For example, network resource 6 can be a cloud-based service that provides access to a cloud-based repository, a governmental or other database that provides information associated with operations within the 6 GHz wireless frequency band, a location service for providing topographical information, a network resource that provides provisioning information, any other repository, or any combination thereof that is accessible via ISP 1. For example, the network resource 6 can be an automated frequency coordination (AFC) system that determines and/or provides one or more frequencies within the 6 GHz frequency band available to a 6 GHz Wi-Fi device at a location (such as a premises). In one or more embodiments, network resource 6 may be accessible via a cellular communications service provider so as to connect to a client device 4, such as a mobile phone, via a connection 14. The connection 14 between the network resource 6 and the ISP 1 and/or client device 4 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (for example, FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3$^{rd}$ Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANS, PANs, WLANs, SANS, a DOCSIS network, a fiber optics network (for example, FTTH, FTTX, or HFC), a PSDN, a global Telex network, or a 2G, 3G, 4G, 5G or 6G network, for example.

The access point device 2 can be, for example, any network device that is capable of being configured to operate and/or operating using a 6 GHz frequency band, such as any 6 GHz Wi-Fi device, an access point and/or a hardware electronic device that may be a combination modem and gateway that combines the functions of a modem, an access point (AP), and/or a router for providing content received from the ISP 1 to one or more network devices (for example, wireless extender access point devices 3 and client devices 4) in the network 120. In one or more embodiments, the access point device 2 can be provisioned based on a transmit power for a location designated by one or more location parameters associated with the access point device 2 so as to provide a 6 GHz wireless frequency band network for one or more network devices connected to the access point device 2, for example, any one or more client devices 4 connected directly and/or indirectly to the access point device 2. In one or more embodiments, a user can utilize a resource (such as any of an application, a link, a hyperlink, an application programming interface (API), a website (or uniform resource locator), a network resource 6, or any combination thereof) to provide an operability indicator as to whether a 6 GHz Wi-Fi device (such as the access point device 2, the extender access point device 3, or both) is permitted or allowed to operate at one or more 6 GHz frequency channels of a 6 GHz frequency band and/or operate at a transmit power that exceeds a certain transmit power, for example, above a low power, within one or more 6 GHz frequency channels of a 6 GHz frequency band for a location, such as a premises. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point device 3, and client device 4 can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use.

The extender access point device 3 can be, for example, wireless hardware electronic devices such as access points (APs), extenders, repeaters, etc. used to extend the wireless network by receiving the signals transmitted by the access point device 2 and rebroadcasting the signals to, for example, one or more client devices 4, which may be out of range of the access point device 2. The one or more extender access point devices 3 can also receive signals from the one or more client devices 4 and rebroadcast the signals to the access point device 2, or other one or more client devices 4.

The one or more client devices 4 can be, for example, any network device capable of communicating with an access point device 2 and/or an extender access point device 3. In one or more embodiments, a client device 4 provides a user interface so as to allow a user to interface with a resource so as to obtain an operability indicator. The operability indicator can indicate, for example, whether a 6 GHz Wi-Fi device is permitted or allowed to operate within a 6 GHz frequency band, such as to operate at one or more 6 GHz frequency channels and/or to operate at one or more 6 GHz frequency channels above a low power. A client device 4 can comprise a hand-held computing device, a personal computer, an electronic tablet, a mobile phone, a smart phone, an Internet-of-Things (IoT) device, an iControl device, cellular network device, and interconnecting with other devices via Wi-Fi and/or Bluetooth, or any other wireless hand-held consumer electronic device capable of accessing a network resource 6, providing the user interface, or both. Additionally, any one or more client devices 4 can be a television (TV), an IP/QAM set-top box (STB) or a streaming media decoder that is capable of decoding audio/video content, and playing OTT or MSO provided content received through the access point device 2. The connection 9 between any of the one or more client devices 4 and one or more other network devices can be any type of wired and/or wireless connection.

Figure 2:
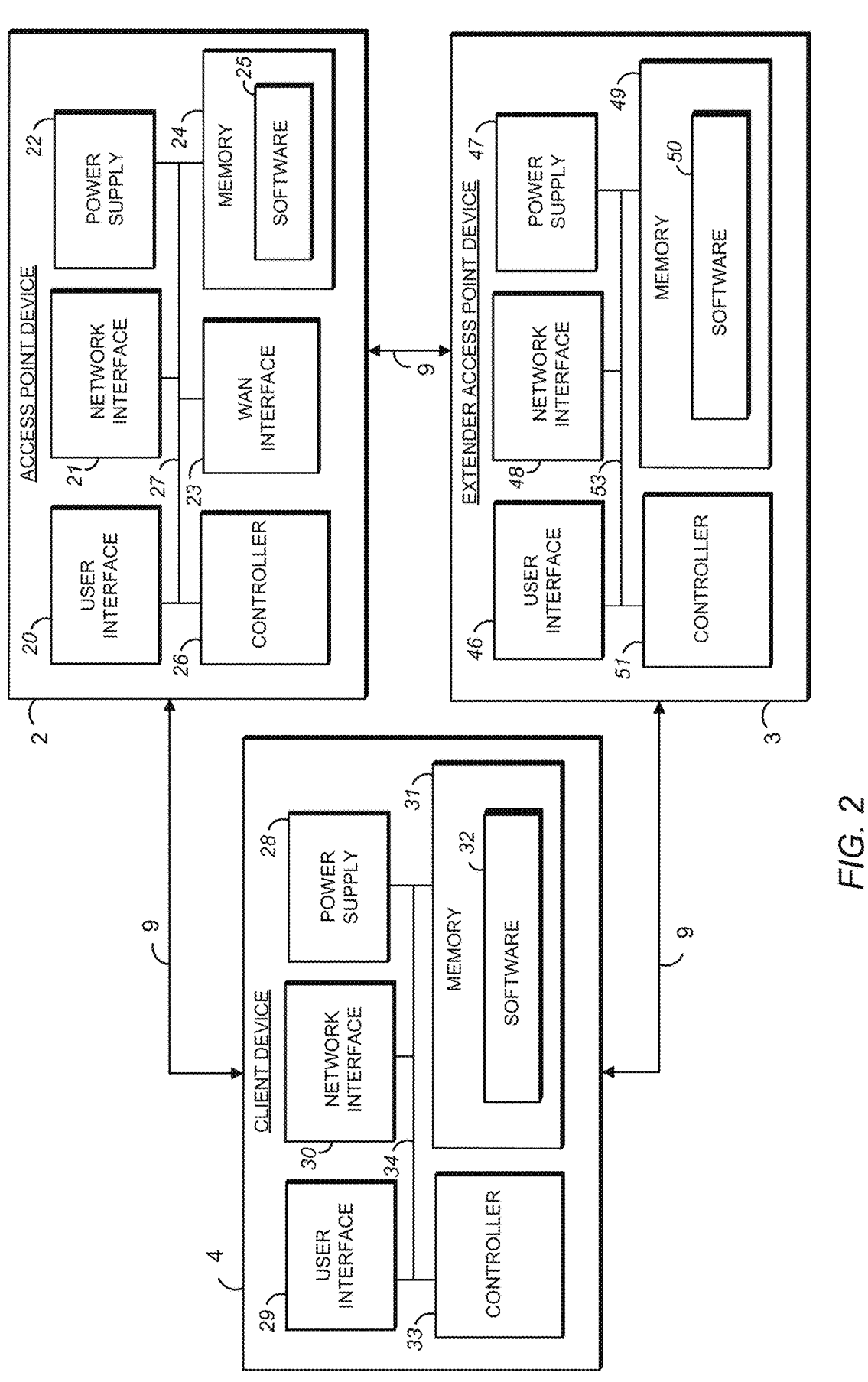
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the one or more extender access point devices 3, and the one or more client devices 4 shown in FIG. 1 will be provided in the discussion of FIG. 2. However, in general, it is contemplated by the present disclosure that the access point device 2, the one or more extender access point devices 3, and the one or more client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the access point device 2, the one or more extender access point devices 3, and the one or more client devices 4 may be adapted to execute any operating system, including Linux, UNIX, Windows, MacOS, DOS, and Chrome OS as well as virtual machines adapted to virtualize execution of a particular operating system, including customized and proprietary operating systems. The access point device 2, the one or more extender access point devices 3, and the one or more client devices 4 are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of one or more exemplary network devices, such as an access point device 2, a client device 4, and a wireless extender access point device 3 implemented in the network environment 100 of FIG. 1, according to one or more aspects of the present disclosure.

Although FIG. 2 shows one access point device 2, one extender access point device 3 and one client device 4, the present disclosure contemplates any number of such network devices of a network environment. Similarly, the connections 9 between the access point device 2, the extender access point device 3, and the client device 4 are meant to be exemplary connections and not to indicate all possible connections between any one or more network devices.

The client device 4 can be, for example, any network device capable of providing a user interface for accessing a resource, utilizing a Wi-Fi network, such as a Wi-Fi network provided by an access point device 2 and/or an extender access point device, or both. For example, a client device 4 is a mobile network device, such as a smart phone, capable of executing software that allows a user to interface with a user interface that provides a operability indicator. The operability indicator can indicate whether a 6 GHz Wi-Fi device can operate within a 6 GHz frequency band, operate at a transmit power of the 6 GHz frequency band at a certain transmit power, such as above low power, or both.

The client device 4 includes a power supply 28, a user interface 29, a network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4, for example, for a user to enter information associated with a location of a network device that can be stored in memory 31, such as any of an address, a height location, a floor, a story, and/or level, a latitude, a longitude, or any combination thereof of a 6 GHz Wi-Fi device, for example, an access point device 2, an extender access point device 3, or both. In one or more embodiments, user interface 29 provides an interface for a user, such as a graphical user interface, to interact with, for example, software 32, to provide a user with an operability indicator. The network interface 30 can include, but is not limited to, various network cards, interfaces, and circuitry implemented in software and/or hardware to enable communications with the access point device 2, the extender access point device 3, ISP 1, and/or network resource 6 using any one or more of the communication protocols in accordance with connection 9 (for example, as described with reference to FIG. 1).

The memory 31 includes a single memory, one or more memories, or one or more memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, software 32 can provide a user interface for interaction with a user so as to provide an operability indicator associated with a 6 GHz Wi-Fi device and/or allow a user to input one or more location parameters associated with a 6 GHz Wi-Fi device so as to receive an operability indicator.

The controller 33 controls the general operations of the client device 4 and includes, but is not limited to, a central processing unit (CPU), a hardware microprocessor, a hardware processor, a multi-core processor, a single core processor, a field programmable gate array (FPGA), a micro-controller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure, such as provisioning access point device 2. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to any one or more client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2 or any other one or more client devices 4.

The extender access point device 3 includes a user interface 46, a power supply 47, a network interface 48, a memory 49, and a controller 51. The user interface 46 can include, but is not limited to, one or more push buttons, a keyboard, a keypad, an LCD, a TFT, an LED, an HD or other similar display device including a display device having touch screen capabilities so as to allow interaction between a user and the extender access point device 3. The power supply 47 supplies power to the internal components of the wireless extender access point device 3 through the internal bus 53. The power supply 47 can be connected to an electrical outlet (for example, either directly or indirectly by way of another device) via a cable or wire. In one or more embodiments, extender access point device 3 communicates with a client device 4 to provide one or more location parameters so that a user can obtain an operability indicator associated with the extender access point device 3.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (for example, a 2.4 GHz radio, one or more 5 GHz radios, and/or a 6 GHz radio), which may also be referred to as wireless local area network (WLAN) interfaces. One radio or set of radios (for example, 5 GHz and/or 6 GHz radio(s)) provides a backhaul connection between the wireless extender access point device 3 and the access point device 2, and optionally other wireless extender access point device(s) 3. Another radio or set of radios (for example, 2.4 GHz, 5 GHZ, and/or 6 GHz radio(s)) provides a fronthaul connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a digital signal processor (DSP), or other similar processing device capable of executing any type of instructions, algorithms, or software for controlling the operation and functions of the wireless extender access point device 3 in accordance with the embodiments described in the present disclosure. General communication between the components (for example, 46-51) of the extender access point device 3 may be established using the internal bus 53.

The access point device 2 can be, for example, any 6 GHz Wi-Fi device including, but not limited to, any of a hardware electronic device that can combine one or more functions of any of a modem, a gateway, an access point (AP), a router, or combinations thereof for providing content received from the content provider (ISP) 1 to network or wireless devices (for example, one or more extender access point devices 3, one or more client devices 4) in the system. It is also contemplated by the present disclosure that the access point device 2 can include the function of, but is not limited to, an IP/QAM STB, an SMD, or any other decoder that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26. The user interface 20 can include, but is not limited to, one or more push buttons, a keyboard, a keypad, an LCD, a TFT, an LED, an HD or other similar display device including a display device having touch screen capabilities so as to allow interaction between a user and the access point device 2. In one or more embodiments, the user interface 20 provides an interface, such as a command-line interface, a graphical user interface, an interface output port for connection to a display, and/or any other type of user interface. In one or more embodiments, access point device 2 communicates with a client device 4 to provide one or more location parameters so that a user can obtain an operability indicator associated with the access point device 2.

The network interface 21 may include various network cards, and circuitry implemented in software and/or hardware to enable communications with the extender access point device 3 and the client device 4 using the communication protocols in accordance with connection 9 (for example, as described with reference to FIG. 1). Additionally, the various network cards, interfaces, and circuitry of the network interface 21 enable communications with a client device 4 (for example, a mobile device) using the one or more communication protocols in accordance with connection 9 (for example, as described with reference to FIG. 1). For example, the network interface 21 can include an Ethernet port (also referred to as a LAN interface) and multiple radios or sets of radios (for example, a 2.4 GHz radio, one or more 5 GHz radios, and/or a 6 GHz radio, also referred to as WLAN interfaces). One radio or set of radios (for example, 5 GHz and/or 6 GHz radio(s)) provides a backhaul connection between the access point device 2 and the wireless extender access point device(s) 3. Another radio or set of radios (for example, 2.4 GHz, 5 GHZ, and/or 6 GHz radio(s)) provides a fronthaul connection between the access point device 2 and one or more client device(s) 4. In one or more embodiments, the network interface 21 interfaces with a network resource 6.

The power supply 22 supplies power to the internal components of the access point device 2 through the internal bus 27. The power supply 22 can be connected to an electrical outlet (for example, either directly or by way of another device) via a cable or wire.

The wide area network (WAN) interface 23 may include various network cards, and circuitry implemented in software and/or hardware to enable communications between the access point device 2 and the ISP 1 using the wired and/or wireless protocols in accordance with connection 13 (for example, as described with reference to FIG. 1).

The memory 24 includes a single memory, one or more memories, or one or more memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for providing a 6 GHz wireless frequency network based on provisioning by a client device 4.

The controller 26 controls the general operations of the access point device 2 as well as connectivity to the network by one or more other network devices (wireless extender access point devices 3 and client device 4). The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 in accordance with the embodiments described in the present disclosure. Communication between the components (for example, 20-24, and 26) of the access point device 2 may be established using the internal bus 27. The controller 26 may also be referred to as a processor, generally.

Figure 3:
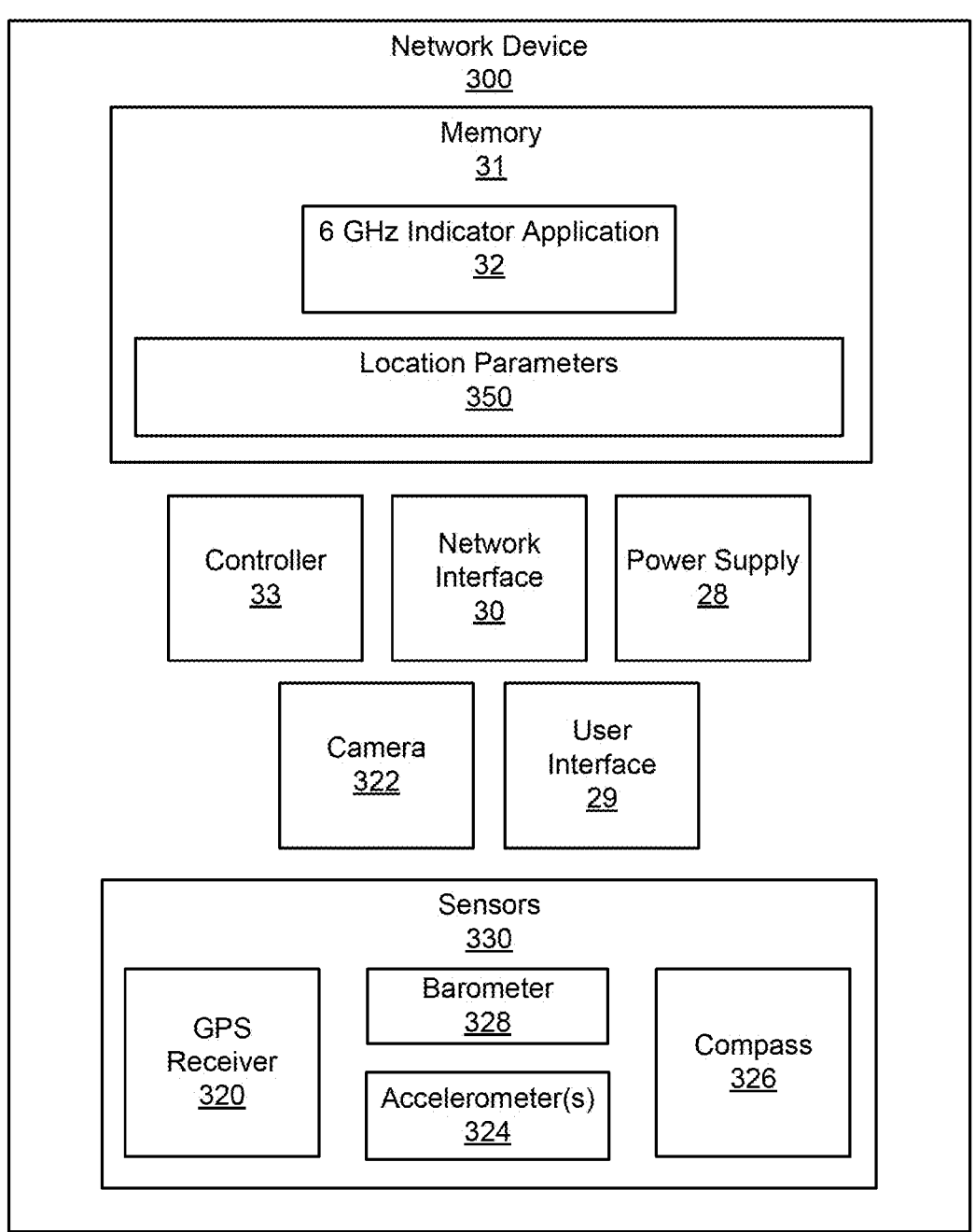
FIG. 3 is a more detailed block diagram illustrating a network device for use in determining one or more location parameters associated with an access point device of a network, according to one or more aspects of the present disclosure.

FIG. 3 is a more detailed block diagram illustrating certain components of an exemplary network device, for example, a client device 4, implemented in the network environment of FIG. 1 and in FIG. 2, according to one or more aspects of the present disclosure.

As shown in FIG. 3, the network device 300 includes a memory 31, a controller 33, a network interface 30, a power supply 28 (such as a rechargeable battery), a user interface 29, a camera 322 or any other device for receiving/recording a visual image, and one or more sensors 330. The one or more sensors 330 can include a global positioning system (GPS) receiver 320, one or more accelerometers 324, a compass or magnetometer 326, a barometer 328 (for example, to obtain a height location or measurement), any other sensor, or any combination thereof. In one or more embodiments, any of the one or more sensors 330 can be part of a single device or one or more devices. The memory 31 can be a computer-readable memory for storing software or one or more computer-readable instructions executable by the controller 33, for example, so as to interface with and/or access a resource, such as any of a user interface 29, a network resource 6, a 6 GHz indicator application 32, a URL, an application, or any combination thereof such that a user can obtain an operability indicator associated with a 6 GHz Wi-Fi device, such as an access point device 2, an extender access point device 3, or both.

As an example, the 6 GHz indicator application 32 can include one or more computer-readable instructions that are executable by the controller or processor 33. In one or more embodiments, the network device 300 can access any resource that provides the same or similar operability indicator as 6 GHz indicator application 32. The 6 GHz indicator application 32 can be implemented by software, hardware, or a combination thereof. The 6 GHz indicator application 32 can provide an operability indicator that indicates operability of a 6 GHz Wi-Fi device within a 6 GHz frequency band, for example, whether the 6 GHz Wi-Fi device is allowed or permitted to operate within the 6 GHz frequency band and/or whether the 6 GHz Wi-Fi device can operate within the 6 GHz frequency band at a transmit power, such as a transmit power above low power.

The network device 300 can receive and/or store one or more location parameters 350 that are indicative of any of a location, a boundary, a height location, an indoor indicator (for example, the indoor indicator indicates a location inside or within a structure, such as any of a home and/or a building), an outdoor indicator (for example, the outdoor indicator indicates a location outside of a structure, such as any of a home and/or building) or any combination thereof of a 6 GHz Wi-Fi device. The one or more location parameters 350 can be based on any of one or more measurements from any of the one or more sensors 330 and/or camera 322 (for example, a scan of a quick resource (QR) code, one or more inputs received from a user interface 29 (such as any of a location, a boundary, a height location, or any combination thereof), an application, a URL, any other resource, or any combination thereof. For example, the one or more location parameters 350 can be based on any of an address, a height parameter (for example, indicative of a height above ground, above sea level, below ground, or below sea level of the access point device 2), a floor number or level of a building, a latitude, a longitude, or any combination thereof. The 6 GHz indicator application 32 or any other resource can be utilized to provide (such as send or transmit) one or more location parameters to one or more access point devices 2, one or more extender access point devices 3, any other network devices, and any combination thereof simultaneously, substantially simultaneously, or sequentially.

In one or more embodiments, the user interface 29 includes a display and a graphical user interface or any other type of user interface. The 6 GHz indicator application 32 can send one or more prompts to the user interface 29 that request information from or provide information to a user of the client device 4. For example, the user interface 29 can display a prompt to the user for information, such as one or more location parameters 350, associated with a 6 GHz Wi-Fi device. In one or more embodiments, the 6 GHz indicator application 32 can automatically fill one or more fields of a user interface based on the one or more location parameters 350, information received from one or more sensors 330, any other information, or any combination thereof.

FIGS. 4A-4D illustrate a user interface for determining operability of a 6 GHz Wi-Fi device at a location, such as a home or business. The user interface can be part of or included within a resource, such as any of a 6 GHz indicator application 32, a cloud-based application such as a resource hosted at a network resource 6, an application accessible via a URL, any other resource, or any combination thereof. The user interface allows for determining whether the 6 GHz Wi-Fi device is operable at a location as identified, for example, by one or more location parameters 350, according to one or more aspects of the present disclosure. For example, a 6 GHz Wi-Fi device can be determined to be operable when a transmit power provided by an AFC indicates that the 6 GHz Wi-Fi device can operate or can operate above low power at the location.

FIG. 4A illustrates a user interface 450 of a resource for indicating to a user whether a 6 GHz Wi-Fi device is operable at a location as indicated by one or more location parameters, such as one or more location parameters 350. For example, a user can launch an application stored in a memory of a network device 300, such as utilize a camera 322 of a network device 300, to scan a quick response (QR) code 440 associated with a 6 GHz Wi-Fi device 442 that directs the user to a resource, such as a resource that provides the user interface 450, enter a URL 414 as illustrated in FIG. 4B that directs the user to a resource, such as a resource that provides the user interface 460, use any other user interface for providing the user an operability indicator as to whether a 6 GHz Wi-Fi device is operable, for example, is permitted or allowed to operate at a location and/or operate above a low power, utilize any other resource, or any combination thereof. For example, a QR code 440 can comprise a tag 441 and can be located or positioned on or about the 6 GHz Wi-Fi device 442 or another object associated with the 6 GHz Wi-Fi device 442, such as packaging, a product display, a price tag or other label, etc., such that when the QR code 440 is scanned by the network device 300, an application is launched as illustrated in FIG. 4A.

As illustrated in FIG. 4A, the user interface 450, and similarly as illustrated in FIG. 4B, the user interface 460, can prompt the user for a location input 418 where a 6 GHz Wi-Fi device will be used so as to determine the location of the 6 GHz Wi-Fi device. An indicator interface 402 is provided to the user. The indicator interface 402 can comprise one or more screens, windows, interfaces, etc. for receiving information from a user and providing information to a user. The indicator interface 402 can comprise a location input 418 for displaying and/or receiving a location, such as one or more location parameters, associated with a 6 GHz Wi-Fi device. For example, the location input 418 can indicate a current location of the network device 300, one or more default addresses, a location input, a boundary area of a premise (such as a home or office), a height parameter (such as any of a minimum height, a maximum height, an uncertainty parameter, or any combination thereof), any other user location input, or any combination thereof should be used for providing the operability indicator, such as operability indicator 420. In one or more embodiments, the location input 418 can be automatically filled with a default location. A default location can be based on any of information received from a scan of a QR code 440, a geolocation service (such as GPS), one or more location parameters previously stored in a memory, any other default or previously stored information, or any combination thereof. For example, "Default Address 1" can be automatically filled with a default location.

A "Current Location" option of the location input 418 can be selected such that the current location of the network device can be obtained using any one or more components of the network device 300, one or more network resources 6, or both. For example, one or more sensors 330 as discussed with reference to FIG. 3, a URL, a network resource 6, a map application, a GPS application, a national repository, any other repository, or any combination thereof can be utilized to obtain one or more coordinates as one or more location parameters. A "Default Address 1" option of the location input 418 can be selected such that an address or one or more coordinates stored in a memory 31 (such as one or more location parameters 350) of the network device 300 or at a network resource 6 (such as a cloud-based repository) can be retrieved for use as the one or more location parameters. An "Enter Location" option can prompt a user to enter a location associated with use of the 6 GHz Wi-Fi device 442. For example, a user can input any of a physical address, one or more coordinates, any other location, or any combination thereof. In one or more embodiments, the user can be presented with an interface 462 and/or 464 as discussed with reference to FIG. 4C and FIG. 4D, respectively. The location of the "Enter Location" can be pre-filled with information, such as one or more location parameters 350 stored in a memory 31. While FIGS. 4A and 4B only illustrate particular options for a location input 418, the present disclosure contemplates various user inputs for receiving and display a location associated with a 6 GHz Wi-Fi device 442. The present disclosure contemplates that a location of use for the 6 GHz Wi-Fi device can be based on one or more coordinates, such a longitude and/or a latitude, which can be retrieved using one or more elements or components of a network device 300, such as one or more sensors 330, a cloud or network service, such as a geocoding service, or both. While FIG. 4A and FIG. 4B utilize a selectable location input 418 with specific options, the present disclosure contemplates any type of user interface or graphical user interface for selection of an option including any of a button, a pull-down menu, a text box, a selection box, any other tool, or any combination thereof. Any one or options of the location input 418 can utilize a geolocation API and/or geolocation resource for obtaining one or more location parameters from a resource.

The operability indicator 420 can indicate an operability of a 6 GHz Wi-Fi device 442 at the location indicated by location input 418, for example, based on one or more location parameters. For example, the operability indicator 420 can be a visual indicator such as a check box that indicates the 6 GHz Wi-Fi device 442 can be operated (a check) or cannot be operated (an "x") at the location as illustrated in FIGS. 4A and 4B. While FIGS. 4A and 4B illustrate a visual indicator, the present disclosure contemplates that any type of indicator could be provided to the user via the user interface 402, such as a text-based indicator.

The user interfaces 450 and 460 can comprise a command button 430. The command button 430 of user interface 460 when selected can cause a check location of the 6 GHz Wi-Fi device 442. Selection of a command button 430 can alter one or more elements of a user interface, such as user interfaces 450 and 460. For example, selection of the command button 430 can alter an indication of the operability indicator 420 as to operability at a location. FIGS. 4A and 4B illustrate a visual indicator that the 6 GHz Wi-Fi device is operable (such as permitted or allowed to operate and/or permitted or allowed to operate above a low power) at the location indicated by the location input 418. As an example, selection of a command button 430 can initiate a request from the network device 300 to a network resource 6, such as an AFC system. The request can comprise one or more location parameters associated with the location input 418 identified or provided by the user via a user interface, such as a user interface 450 or user interface 460. The AFC system can provide a response to the request to the network device 300. For example, the request can comprise information, such as a location, associated with a 6 GHz Wi-Fi device and a query for obtaining a transmit power for each of or associated with one or more AFC controlled channels (such as illustrated in FIGS. 5A and 5B) for the location (for example, for a 6 GHz Wi-Fi device at a location as indicated by any of a latitude, a longitude, an address, a boundary, a height, or any combination thereof). The AFC system can send a response to the network device 300 that comprises operability information for the 6 GHz Wi-Fi device at the indicated location. The operability information can comprise a transmit power associated with one or more 6 GHz channels or a denial of operation (for example, that no transmit power associated with one or more 6 GHz channels is permitted).

In one or more embodiments, a proxy location service can be utilized in lieu of or instead of an AFC system. For example, one or more location parameters can be used as an input to a proxy location service of a network resource 6. The proxy location service, for example, can store one or more locations that have no limitations on use of a 6 GHz Wi-Fi device. When a user selects the command button 430, the network device 300 can query the proxy location service based on one or more location parameters. The proxy location service can determine whether the one or more location parameters indicate an area not restricted to a transmit power. If no restrictions are associated with the location indicated by the one or more location parameters, the proxy location service can return or provide a response that comprises an operability indicator without querying an AFC system for finer details, such as a transmit power associated with one or more 6 GHz channels. If restrictions are associated with the location indicated by the one or more location parameters, the proxy location service can query an AFC system to receive a transmit power associated with one or more 6 GHz channels, for example, as illustrated in FIGS. 5A and 5B, and return operability information to the network device 300, for example, to a user interface 450 or a user interface 460.

Figure 4C:
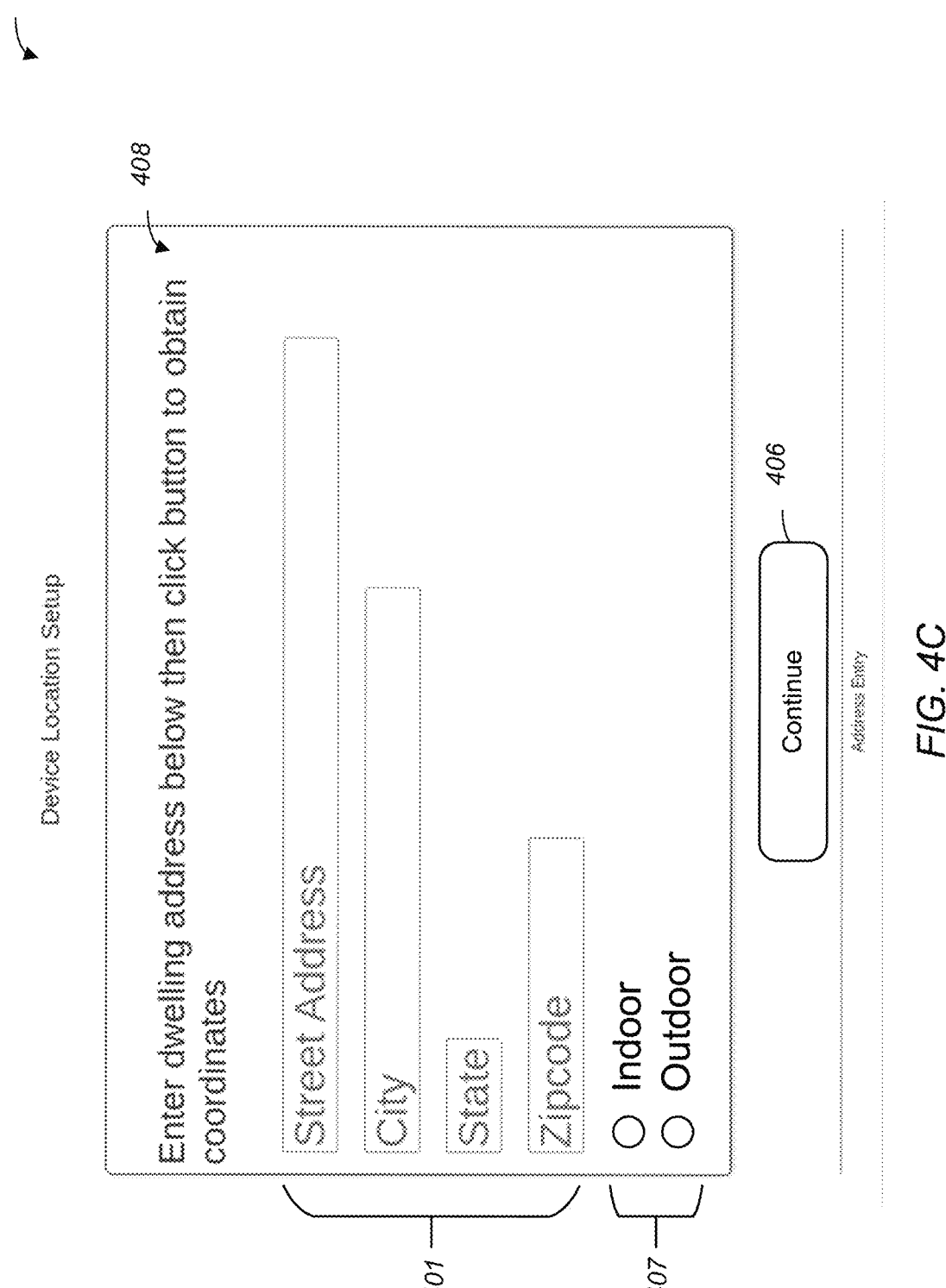

FIG. 4C illustrates a height location user interface 462 of a user interface that includes a prompt 408 for a user to enter an address 401, for example, for the location input 418, associated with the 6 GHz Wi-Fi device 442, an environment indicator 407, for example, an indicator that indicates the 6 GHz Wi-Fi device 442 is to be used or operated inside (such as interior) or outside (such as exterior) of a structure, or both. The command button 406, labeled as "Continue", for example, when selected by a user can retrieve one or more coordinates associated with the address 401. Selecting command button 406 can cause the application to proceed to FIG. 4D or display one or more 6 GHz channels that the 6 GHz Wi-Fi device 442 is allowed or permitted to operate at a transmit power at the specified location. While the environment indicator 407 is illustrated with respect to FIG. 4C, the present disclosure contemplates that the environment indicator 407 can be used with any user interface, such as user interfaces of FIGS. 4A and/or 4B. While the environment indicator 407 is illustrated as a radio button, the present disclosure contemplates a user interface element that allows for the selection of both indoor and outdoor.

Figure 4D:
Figure 5A:
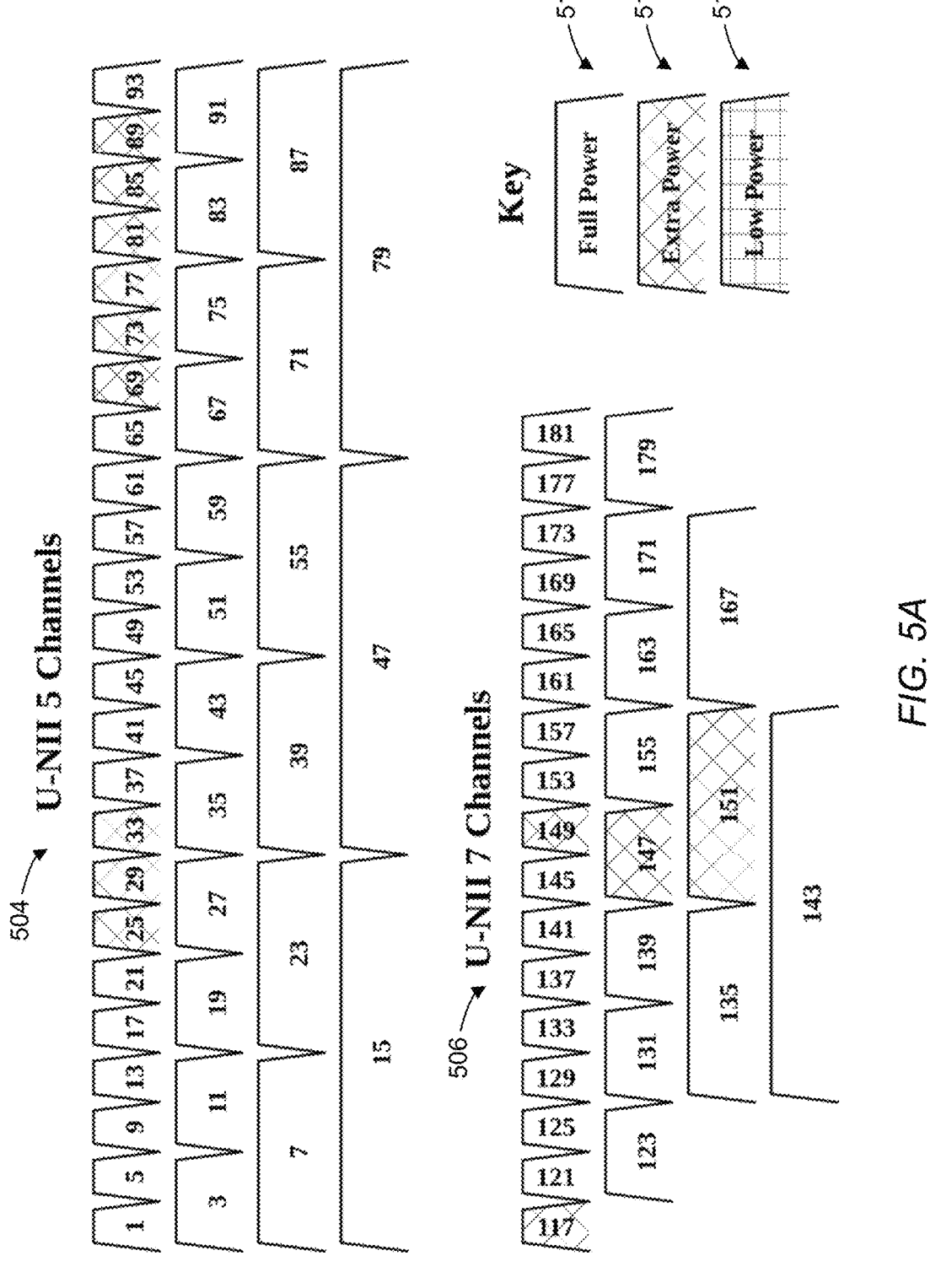
FIGS. 5A and 5B illustrate an indication of one or more 6 GHz channels of one or more 6 GHz frequency bands for operation of a 6 GHz Wi-Fi device.
Figure 5B:
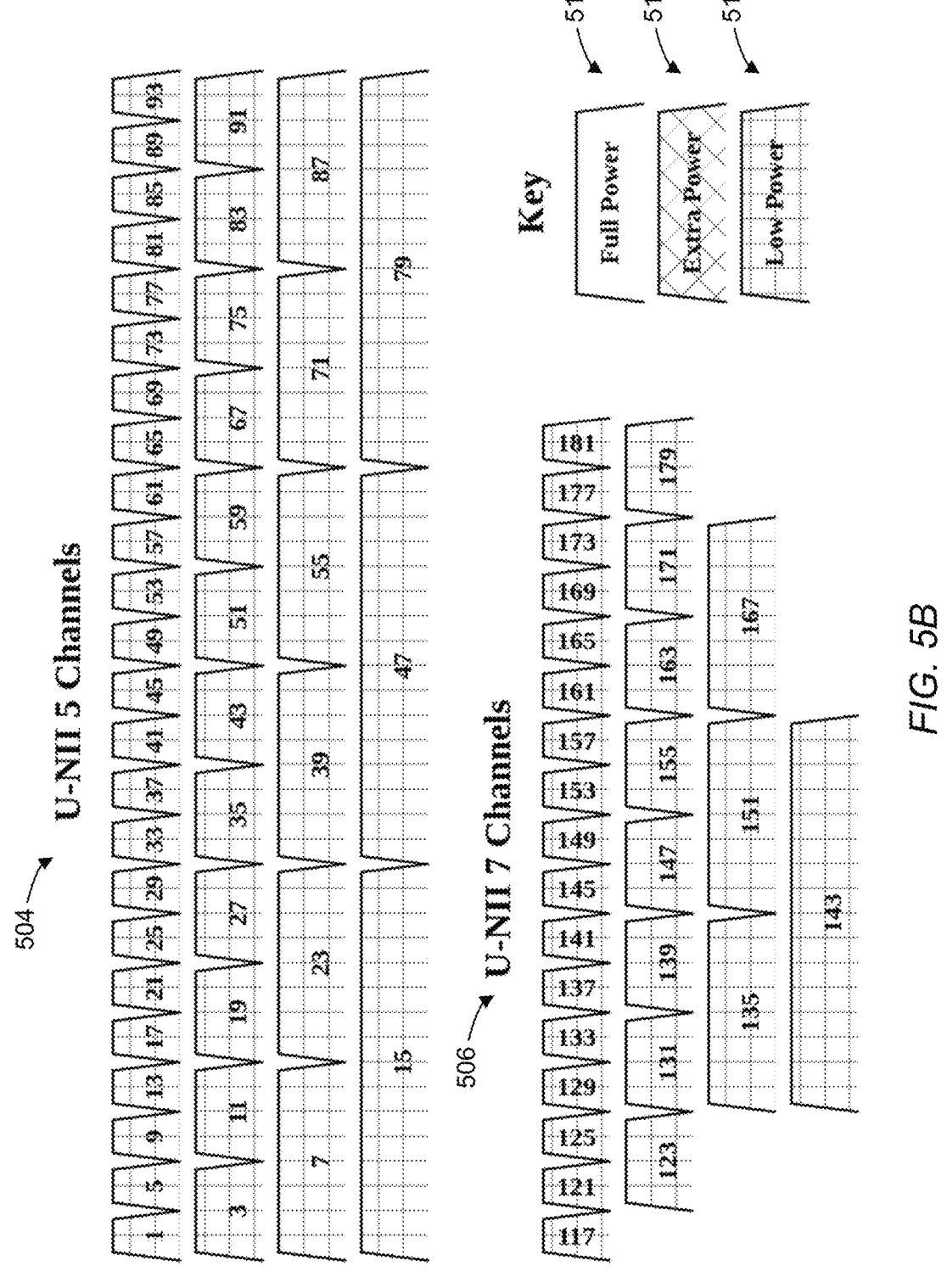

FIG. 4D illustrates a user interface 464 for obtaining a height parameter 409 associated with the 6 GHz Wi-Fi device 442, for example, to provide a more accurate location associated with the use or operation of the 6 GHz Wi-Fi device 442. The user interface 464 provides a height location selection instruction 410 to a user so as to select one or more height parameters 409. For example, a user can be presented with any of one or more height response options 403, for example, which indicate a floor, a story, and/or a level of a premises or site, a minimum and/or maximum height input 405, any other height indicator, or any combination thereof. In one or more embodiments, the height location is based on the one or more height parameters 409. The command button 412, labeled as "Find Allowed Channels", for example, when selected by a user can retrieve one or more 6 GHz frequencies and display the one or more 6 GHz frequencies and/or a transmit power associated with the one or more 6 GHz frequencies, such as illustrated in FIGS. 5A and 5B, display one or more 6 GHz channels that the 6 GHz Wi-Fi device 442 is allowed or permitted to operate at the specified location, or both. While FIG. 4D illustrates options for selecting a height above sea level or above ground, the present disclosure contemplates selecting a depth below sea level or a depth below ground, such as a one or more basement or garage levels. The height location is based on the one or more height parameters to the one or more height location response options received from the user. In one or more embodiments, the height location can be indicative of or used to determine a vertical or height uncertainty. Allowing a user to indicate a height for the location associated with the 6 GHz Wi-Fi device 442 can provide a more accurate indicator as to the operability of the 6 GHz Wi-Fi device.

In one or more embodiments, FIG. 4D can be omitted and the height location can be provided by any of a barometer 328, a GPS receiver 320, any other sensor, any other source and/or service that provides a height parameter, or any combination thereof. In one or more embodiments, one or more height parameters are pre-filled in FIG. 4D and the user is permitted to change or alter the one or more pre-filled height parameters so as to indicate a height location of the 6 GHz Wi-Fi device 442. In one or more embodiments, the user interface can utilize a default height and/or boundary that exceeds any such height and/or boundary associated with a location so as to not burden or require a user to enter such information. For example, if all premises within a certain boundary are at or below a certain height, such as at or below a certain number of stories, the user interface can utilize the highest height (the highest story) instead of requesting the user to enter a height or draw a boundary.

FIGS. 5A and 5B illustrate an indication of one or more 6 GHz channels of one or more 6 GHz frequency bands for operation of a 6 GHz Wi-Fi device. In one or more embodiments, a visual indicator, such as operability indicator 420 as discussed with reference to FIG. 4, could be provided to a user via a user interface that indicates one or more 6 GHz channels 502, such as any of one or more channels of a first frequency band 504 of the 6 GHz frequency band (for example, one or more Unlicensed National Information Infrastructure (U-NII)-5 channels), one or more channels of a second frequency band 506 of the 6 GHz frequency band (for example, one or more UNII-7 channels), or both. For example, a channel can be indicated for use at full power 512, extra power 514, or low power 516. FIG. 5A illustrates certain channels are available for use at extra power 514 (U-NII 5 channels 25, 29, 33, 69, 73, 77, 81, 85, 89 and 93) and at full power 512 (U-NII 7 channels 117, 149, 147, and 151). FIG. 5B illustrates that all channels, for example, of the first frequency band 504 and the second frequency band 506, are only available for use at low power 516. Based on the indicator 502, a user can determine whether or not a 6 GHz Wi-Fi device will provide adequate operation at a particular location. For example, a user can determine to any of purchase, install, operate, or otherwise use the 6 GHz Wi-Fi device associated with a location. A user that receives an indication that only low power is available, as illustrated in FIG. 5B, can determine that a 6 GHz Wi-Fi device would not meet requirements of the user and thus the user can determine to not expend resources by purchasing and installing the 6 GHz Wi-Fi device. In contrast, a user that receives an indication that some channels at extra power are available, as illustrated in FIG. 5A, can determine that a G 6 GHz Wi-Fi device would meet requirements of the user and thus the user is inclined to purchase and install the 6 GHz Wi-Fi device.

Figure 6:
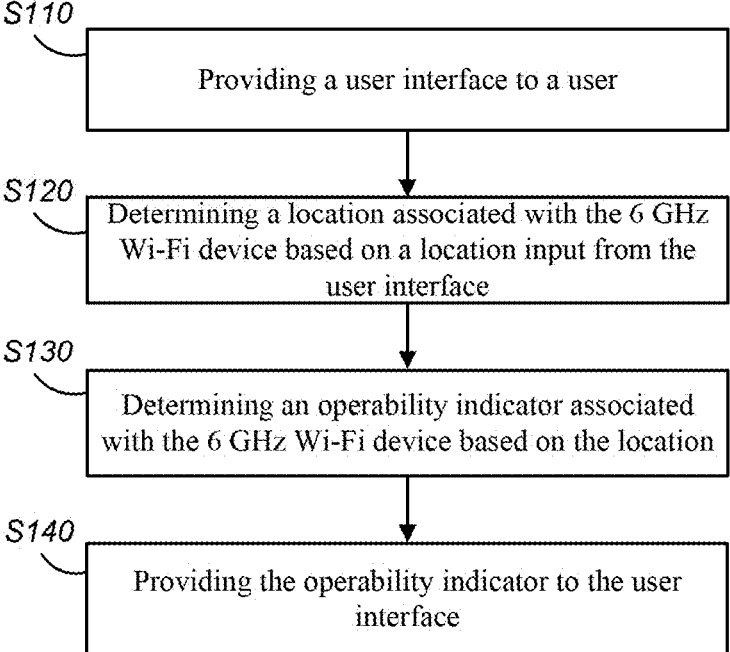
FIG. 6 is a flow chart illustrating a method for indicating that a 6 GHz Wi-Fi device is operational at a location, according to one or more aspects of the present disclosure.

FIG. 6 is a flow chart illustrating a method for indicating that a 6 GHz Wi-Fi device is operational at a location, such as a premise of a home or a business, according to one or more aspects of the present disclosure. A network device 300, such as a client device 4, may be programmed with one or more computer-readable instructions such as a 6 GHz indicator application 32 that when executed by a controller 33 cause the network device 300 to provide an operability indicator as to operability of a 6 GHz Wi-Fi device at a location, according to one or more embodiments, so as to provide an enhanced QoE for users of a network environment. For example, prior to a user expending resources, including, but not limited to, cost and/or time, a user can be provided with an operability indicator that a 6 GHz Wi-Fi device is operable at a location, such as is permitted or allowed to operate and/or permitted or allowed to operate at a transmit power greater than low power. In FIG. 6, it is assumed that any one or more of the devices include their respective controllers and their respective software stored in their respective memories, as discussed above in connection with FIGS. 1-5, which when executed by their respective controllers perform the functions and operations in accordance with the example embodiments of the present disclosure (for example, including performing a configuration of one or more network devices). While the steps S110-S140 are presented in a certain order, the present disclosure contemplates that any one or more steps can be performed simultaneously, substantially simultaneously, repeatedly, in any order or not at all (omitted).

At step S110, a network device can provide a user interface to a user for providing an operability indicatory associated with a location of a 6 GHz Wi-Fi device. The user interface can comprise any of a graphical user interface, a text-based user interface, any other user interface, or any combination thereof. In one or more embodiments, the user interface can be accessed via any of a uniform resource locator (URL), an application of a network device, a link, a hyperlink, an application programming interface (API) of a network resource or any combination thereof. Accessing the user interface can comprise launching or otherwise executing one or more computer-readable instructions.

At step S120, the network device determines a location associated with the 6 GHz Wi-Fi device based on a location input from the user interface. In one or more embodiments, the location input is pre-filled or automatically filled. For example, the location input can be pre-filled or auto-filled based on any of one or more location parameters previously stored and/or received via one or more geocoding services, information received via one or more sensors of the network device, such as a camera (for example, used to scan a QR code), any other location input, or any combination thereof.

At step S130, the network device determines an operability indicator associated with the 6 GHz Wi-Fi device based on the location determined at step S120. The operability indicator can be any of a visual indicator, for example, a chart, a graph, a table, an image, a map, an illustration (for example, as discussed with reference to FIGS. 5A and 5B), any other visual, or any combination thereof. The operability indicator indicates a transmit power for one or more 6 GHz channels for the 6 GHz Wi-Fi device at the location. The operability indicator indicates one or more 6 GHz channels that the 6 GHz Wi-Fi device can utilize at the location. For example, the operability indicator notifies or otherwise informs, for example, a user, that the 6 GHz Wi-Fi device can be operated or otherwise used at a transmit power associated with one or more 6 GHz channels. In one or more embodiments, the network device can send a query or request to an AFC system. The query or request can comprise the location. The location can comprise any one or more coordinates, such as any of a latitude, a longitude, a height, or any combination thereof, an address, a height above sea level or below sea level (referred to also as a depth), any other location information, or any combination thereof. The AFC system returns a transmit power information associated with the 6 GHz Wi-Fi device at the location. The transmit power information can comprise a transmit power for each of or associated with one or more 6 GHz frequency bands, such as one or more 6 GHz channels of one or more 6 GHz frequency bands, for example, as illustrated in FIGS. 5A and 5B. The operability indicator can then be based on the transmit power information received from the AFC system based on the request.

At step S140, the network device provides the operability indicator to the user interface. Providing the operability indicator to the user interface can comprise displaying any of a graph, a chart, a table, an image, a map, an illustration, any other visual, or any combination thereof. In this way, a user can be informed of the utility of a 6 GHz Wi-Fi device at a location prior to expending resources, such as purchasing and/or installation.

According to one or more example embodiments of inventive concepts disclosed herein, there are provided novel solutions for providing a user with an operability indicator as to operability of a 6 GHz Wi-Fi device at a location.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method for providing an operability indicator associated with a location of a 6 Gigahertz (GHz) wireless fidelity (Wi-Fi) device in a network device, the method comprising:

providing a user interface to a user;

determining a location associated with the 6 GHz Wi-Fi access point device based on a location input for the network device from the user interface;

determining an operability indicator associated with the 6 GHz Wi-Fi device based on the location associated with the 6 GHz Wi-Fi access point device; and providing a visual indicator of operability for the 6 GHz Wi-Fi access point device to the user interface based on the determination of the operability indicator.

2. The method of claim 1, wherein the visual indicator includes a first visual indicator that the 6 GHz Wi-Fi access point device can operate and a second visual indicator that the 6 GHz Wi-Fi access point device cannot operate.

3. The method of claim 1, wherein the visual indicator indicates one or more 6 GHz channels that the 6 GHz Wi-Fi access point device can utilize at the location associated with the 6 GHz Wi-Fi access point device.

4. The method of claim 3, wherein the visual indicator indicates a transmit power associated with the one or more 6 GHz channels.

5. The method of claim 1, wherein the user interface is accessed via any of a uniform resource locator (URL), an application of a network device, a link, a hyperlink, an application programming interface (API) of a network resource or any combination thereof.

6. The method of claim 1, wherein the location input is pre-filled in the user interface.

7. The method of claim 1, wherein determining the operability indicator comprises sending a request to an automated frequency coordination (AFC) system, wherein the operability indicator is based on the transmit power information received from the AFC system based on the request.

8. A non-transitory computer-readable medium storing one or more instructions for providing an operability indicator associated with a 6 Gigahertz (GHz) wireless fidelity (Wi-Fi) device, that when executed by a processor, cause a network device to perform one or more operations comprising:

providing a user interface to a user;

determining a location associated with the 6 GHz Wi-Fi device based on a location input for the network device from the user interface;

determining an operability indicator associated with the 6 GHz Wi-Fi device based on the location associated with the 6 GHz Wi-Fi access point device; and providing a visual indicator of operability for the 6 GHz Wi-Fi access point device to the user interface based on the determination of the operability indicator.

9. The non-transitory computer-readable medium of claim 8, wherein the visual indicator includes a first visual indicator that the 6 GHz Wi-Fi access point device can operate and a second visual indicator that the 6 GHz Wi-Fi access point device cannot operate.

10. The non-transitory computer-readable medium of claim 8, wherein the visual indicator indicates one or more 6 GHz channels that the 6 GHz Wi-Fi access point device can utilize at the location associated with the 6 GHz Wi-Fi access point device.

11. The non-transitory computer-readable medium of claim 10, wherein the visual indicator indicates a transmit power associated with the one or more 6 GHz channels.

12. The non-transitory computer-readable medium of claim 8, wherein the user interface is accessed via any of a uniform resource locator (URL), an application of a network device, a link, a hyperlink, an application programming interface (API) of a network resource or any combination thereof.

13. The non-transitory computer-readable medium of claim 8, wherein the location input is pre-filled in the user interface.

14. The non-transitory computer-readable medium of claim 8, wherein determining the operability indicator comprises sending a request to an automated frequency coordination (AFC) system, wherein the operability indicator is based on the transmit power information received from the AFC system based on the request.

15. A network device for providing an operability indicator associated with a location of a 6 Gigahertz (GHz) wireless fidelity (Wi-Fi) access point device, the network device comprising:

a memory storing one or more computer-readable instructions; and a processor configured to execute the one or more computer-readable instructions stored on the memory to cause the network device to:

provide a user interface to a user;

determine a location associated with the 6 GHz Wi-Fi access point device based on a location input for the network device from the user interface;

determine an operability indicator associated with the 6 GHz Wi-Fi device based on the location associated with the 6 GHz Wi-Fi access point device; and provide a visual indicator of operability for the 6 GHz Wi-Fi access point device to the user interface based on the determination of the operability indicator.

16. The network device of claim 15, wherein the visual indicator includes a first visual indicator that the 6 GHz Wi-Fi access point device can operate and a second visual indicator that the 6 GHz Wi-Fi access point device cannot operate.

17. The network device of claim 15, wherein the visual indicator indicates one or more 6 GHz channels that the 6 GHz Wi-Fi access point device can utilize at the location associated with the 6 GHz Wi-Fi access point device.

18. The network device of claim 17, wherein the visual indicator indicates a transmit power associated with the one or more 6 GHz channels.

19. The network device of claim 15, wherein the user interface is accessed via any of a uniform resource locator (URL), an application of a network device, a link, a hyperlink, an application programming interface (API) of a network resource or any combination thereof.

20. The network device of claim 15, wherein determining the operability indicator comprises sending a request to an automated frequency coordination (AFC) system, wherein the operability indicator is based on the transmit power information received from the AFC system based on the request.

* * * * *